United States Patent
Wei et al.

(10) Patent No.: US 9,663,922 B2
(45) Date of Patent: May 30, 2017

(54) PACE REGULATION

(71) Applicant: Caterpillar Inc., Peoria, IL (US)

(72) Inventors: Mo Wei, Dunlap, IL (US); Michael Taylor, Peoria, IL (US); Thandava Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 26 days.

(21) Appl. No.: 14/677,407

(22) Filed: Apr. 2, 2015

(65) Prior Publication Data

US 2016/0289922 A1    Oct. 6, 2016

(51) Int. Cl.
| | |
|---|---|
| *E02F 9/20* | (2006.01) |
| *G05D 1/00* | (2006.01) |
| *G05D 1/02* | (2006.01) |
| *E02F 9/26* | (2006.01) |
| *E02F 3/84* | (2006.01) |
| *E01C 19/00* | (2006.01) |

(52) U.S. Cl.
CPC .......... *E02F 9/2054* (2013.01); *E02F 3/841* (2013.01); *E02F 9/205* (2013.01); *E02F 9/2045* (2013.01); *E02F 9/262* (2013.01); *G05D 1/0088* (2013.01); *G05D 1/0291* (2013.01); *E01C 19/004* (2013.01)

(58) Field of Classification Search
CPC ................ G05D 1/00; G05D 1/02; E02F 9/20
USPC .......................... 701/23, 24, 25, 26, 50, 527
See application file for complete search history.

(56) References Cited

U.S. PATENT DOCUMENTS

| | | | |
|---|---|---|---|
| 6,502,016 B1 * | 12/2002 | Ozaki ..................... | E02F 3/841 701/23 |
| 7,305,287 B2 | 12/2007 | Park | |
| 8,265,873 B2 * | 9/2012 | D'Andrea ............ | G01C 21/005 701/410 |
| 8,428,790 B2 * | 4/2013 | Koch .................... | E02F 9/2054 701/2 |
| 8,755,976 B2 | 6/2014 | Peters et al. | |
| 9,008,886 B2 * | 4/2015 | Braunstein ........... | G05D 1/0276 701/2 |
| 2008/0243345 A1 * | 10/2008 | Knight ..................... | E02F 3/84 701/50 |
| 2012/0136508 A1 * | 5/2012 | Taylor ................... | E02F 9/2045 701/2 |
| 2012/0136523 A1 * | 5/2012 | Everett ................. | E02F 9/2045 701/24 |
| 2013/0311031 A1 * | 1/2013 | Friend .................. | G05D 1/0278 701/26 |
| 2014/0032015 A1 * | 1/2014 | Chun .................... | G08G 1/166 701/2 |

(Continued)

*Primary Examiner* — Thomas G Black
*Assistant Examiner* — Wae Louie
(74) *Attorney, Agent, or Firm* — Miller, Matthias & Hull

(57) ABSTRACT

Automated excavating uses automated dozers and other earthmoving equipment to move material at a worksite. Some areas of the worksite may require that control of the automated dozer revert to manual control, such as a spread zone near a crest. A controller monitors the position of automated dozers and adjusts an operating characteristic of an individual automated dozer so that there are not more dozers in the zone than there are operators to manually control them. The adjustment made may depend on the blade loading of an individual dozer, particularly so that a dozer with a loaded blade is not brought to a complete stop, which may cause undue wear on the dozer when re-starting.

20 Claims, 5 Drawing Sheets

(56) References Cited

U.S. PATENT DOCUMENTS

| | | | |
|---|---|---|---|
| 2014/0163779 A1* | 6/2014 | Braunstein | G05D 1/021 701/2 |
| 2014/0163805 A1* | 6/2014 | Braunstein | G05D 1/0276 701/23 |
| 2014/0277899 A1* | 9/2014 | Matsuzaki | G05D 1/0287 701/25 |
| 2014/0277957 A1* | 9/2014 | Clar | E02F 5/32 701/50 |
| 2016/0069045 A1* | 3/2016 | Wei | E02F 9/2025 701/50 |
| 2016/0076223 A1* | 3/2016 | Wei | E02F 9/2029 701/50 |
| 2016/0076224 A1* | 3/2016 | Edara | E02F 9/2029 701/50 |

* cited by examiner

PACE REGULATION

TECHNICAL FIELD

The present disclosure relates to control of automated excavation machines, particularly real-time coordination between multiple automated excavation machines.

BACKGROUND

Worksites, particularly mining worksites, are increasingly using automated machines, such as automated dozers, to move earth into position for excavation and processing. The automated machines often work in parallel slots using location information and topographical maps to determine where to load and spread. In many cases, the spread zone is at a crest or ledge where traveling too far may result in the machine tipping over the crest or causing a slide. In these cases, the machine may be released from automatic control and operated manually by a remote human operator.

It is possible that more machines may enter the spread zone than there are human operators to manually control them. In this case, it is common to stop a machine prior to its entering the spread zone. However, restarting a machine with a fully loaded blade induces a great deal of stress on multiple areas of the machine from the blade to the drive train. This may lead to increased wear and unnecessarily accelerate component failure in the drive train, tracks, and blade components of the machine.

With respect to preventing multiple machines from being in a particular operating zone, U.S. Pat. No. 8,265,873 (the '873 patent) discloses a system that divides the path for a mobile unit into segments and reserves various segments along its path to prevent multiple units from concurrently occupying the same path segment. The '873 patent at least fails to account for a state of the machine, such as blade load, when allocating segment reservations.

SUMMARY OF THE DISCLOSURE

In an aspect of the disclosure, a method of managing automated machines at a worksite includes identifying a zone at the worksite, the zone having geographic boundaries specified, and setting a limit on a number of machines concurrently allowed in the zone. The method may continue by predicting when a first machine will be within the geographic boundaries of the zone and also predicting that a second machine operating at current conditions will be within the geographic boundaries of the zone concurrently with the first machine such that the second machine's entry into the zone will cause the number of machines in the zone to exceed the limit. The method may continue by analyzing a load of a blade on the second machine and when the second machine blade is loaded, setting, via a controller remote from the automated machines, the second machine to a lower speed than a current speed. The lower speed may be calculated to prevent the second machine from entering the zone while the first machine occupies the zone. The method may also include, when the blade of the second machine is unloaded, stopping, via the controller, the second machine for a duration calculated to prevent the second machine from entering the zone while the first machine occupies the zone.

In another aspect of the disclosure, a system for managing automated machines includes a first machine that operates responsive to commands from a controller, a second machine that operates responsive to commands from the controller, and the controller. The controller may be configured to send operating commands to the first and second machines, wherein the controller defines a zone with geographic boundaries at the worksite and predicts that more than a predetermined number of machines will be within the zone given a current operating state of each machine. Responsive to the prediction, the controller controls the second machine according to a load of a blade on the second machine to prevent entry of the second machine into the zone when the first machine is in the zone.

In yet another aspect of the disclosure, a controller that manages two or more automated machines operating in separate designated slots at a worksite includes a processor, an output driver coupled to the processor used to control at least one automated machine, and a memory coupled to the processor storing executable instructions. The executable instructions cause the processor to identify a zone within the worksite, identify a limit number of machines that can operate in the zone concurrently, and determine, based on a location prediction, when more than the limit number of machines will occupy the zone concurrently. Based on the current operating state of at least one of the two or more machines, the controller may alter an operating characteristic of at least one of the two or more automated machines to prevent more than the limit number of machines from occupying the zone concurrently.

DETAILED DESCRIPTION

Figure 1:
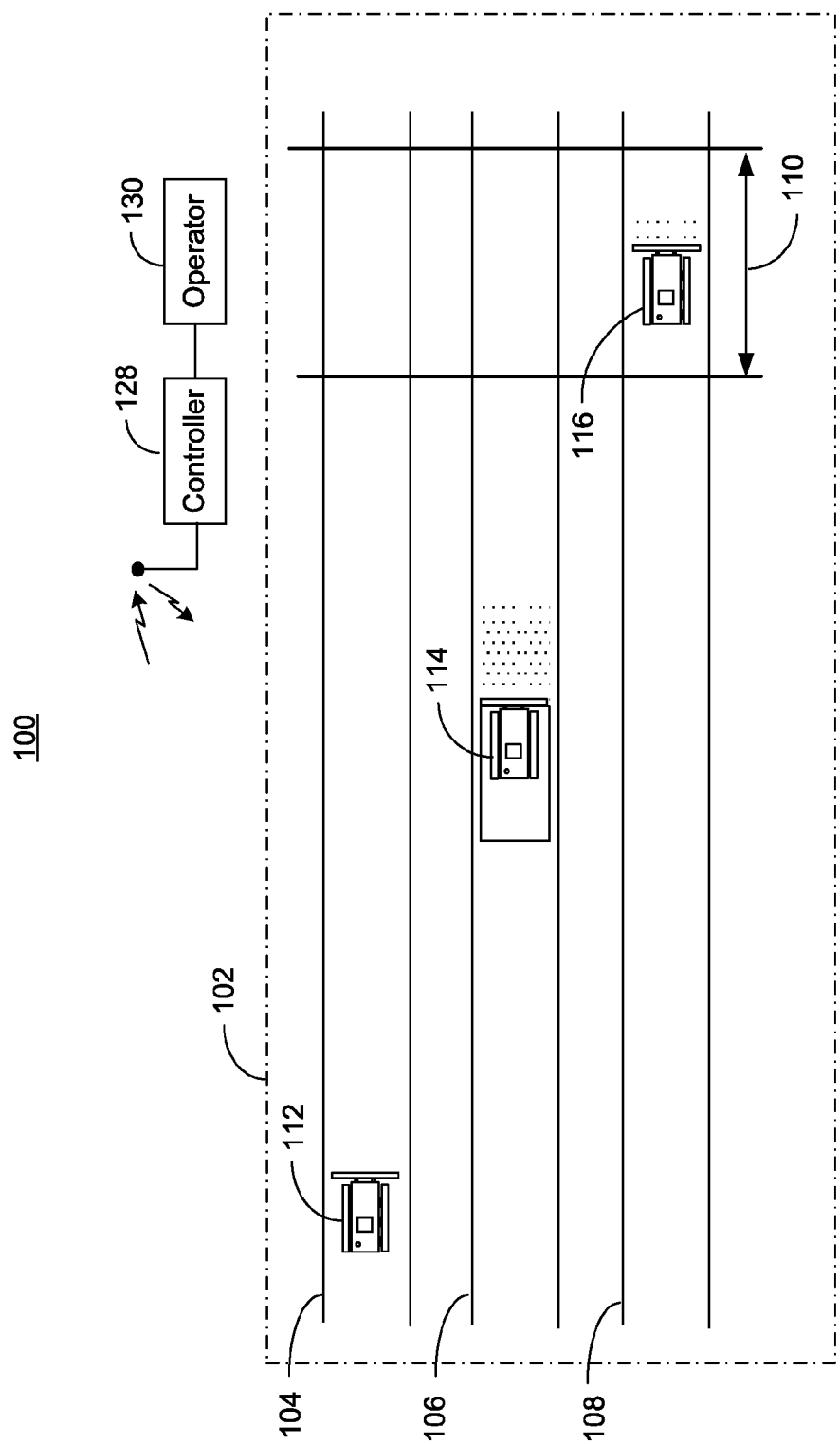
FIG. 1 is a plan view of a worksite.

Mining and other earthmoving-related operations are increasingly using automated mobile excavation machines to cut contours and move earth either out of the way or to a loading/processing area. FIG. 1 illustrates a mining operation 100 including a worksite 102 set up for automated excavation work. The worksite 102 may include designated slots 104, 106, 108 in which respective automated machines 112, 114, 116 may operate, such as automated track-type tractor dozers. The worksite 102 may include a spread zone 110, also known as a spread gap or crest zone where material accumulated during the run of the machine 116 may be unloaded from the blade 117.

A controller 128 may be located at a central control station and may communicate with each of the automated machines 112, 114, 116 to receive both information about the position and status of each of the machines and to send instructions to each of the machines regarding speed, direction, blade position, ripper position, etc. The status of the machine may include operational information such as drawbar pull, blade position, gear setting, and groundspeed as well as state information such as oil pressure, fuel level, oil and coolant temperatures, etc.

One or more human operators 130 may interact with the controller 128 to both oversee automated operations and to manually take control of a particular machine when needed, for example when operating in the spread zone 110.

Figure 2:
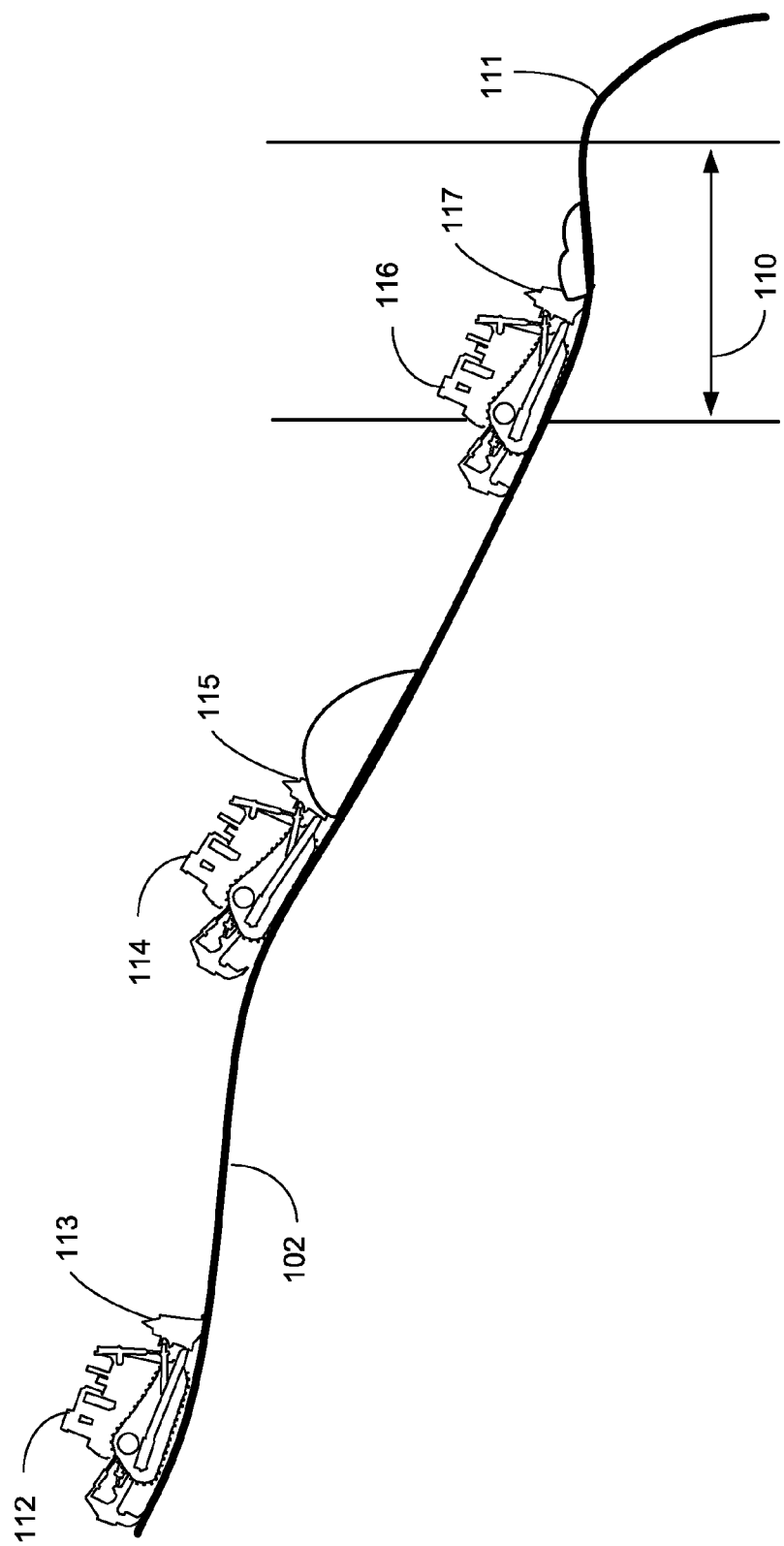
FIG. 2 is a side elevation view of the worksite of FIG. 1.

FIG. 2 illustrates a side view of the worksite 102 illustrating spread zone 110 and associated crest 111. FIG. 2 shows the current position of the machines in FIG. 1, with machine 112 at a top or start of its slot 104 with its blade 113 unloaded, machine 114 in mid-run with a loaded blade 115 at slot 106, and machine 116 in the process of spreading its load from blade 117 in the spread zone 110 of slot 108. The need for caution while operating in the spread zone 110 is apparent from the crest 111 and associated drop off so that the machine 116 is not unnecessarily put at risk of toppling over the crest 111. For this reason the operator 130 may take over manual control of the operation of any machine 112, 114, 116 while it is in the spread zone 110. As will be referred to below, the maximum blade load may occur any time after the beginning of the run, such as during the mid-portion of a particular slot and may continue through to a beginning of the spread zone 110. It is common for a blade load of an exemplary machine 116 to be in a range of 100 tons.

In the following example for simplicity of explanation it will be assumed that there is one human operator and a limit of one will be set for the number of automated machines 112, 114, 116 that can be allowed in the spread zone 110 at one time. Obviously, other operating conditions may dictate a different limit. Should the controller 128 determine that in order to avoid having two of the machines 112, 114, 116 concurrently operating in the spread zone 110, a change to a current operating state of one or more of the machines 112, 114, 116 needs to occur.

For example, referring to FIG. 2, the controller 128 may determine that machines 114 and 116 will concurrently occupy the spread zone 110. Because the rule in this example embodiment does not allow two machines to concurrently occupy the spread zone 110, the controller 128 may send one or more operating commands to change an operating characteristic of one machine to delay its entry to the spread zone 110. Again in this example, the machine 116 that is currently in the spread zone 110, is already under manual control, so the controller is limited to changing the operating characteristic of the other machine 114. In the case where both machines are still under automated control, more options may be available, as discussed below.

One option is to stop machine 114. However, as discussed above, starting machine 114 from a dead stop with a loaded blade may cause an undesirable wear on one or more of its components. Therefore, when the machine 114 has a loaded blade it is preferable to slow the machine 114 rather than stop it. This may be accomplished by reducing its gear in order to delay its entry into the spread zone 110. Reducing a throttle setting is another option, but often this type of machine is operated at an optimum range of engine revolutions per minute (rpm) settings so reducing the gear may be the preferred way to slow the machine.

In another example, the controller 128 may determine that machine 112 and machine 114 will occupy the spread zone 110 concurrently. In this case, machine 112 may be stopped since it's blade is unloaded and no undesirable wear will be incurred by restarting from the stopped state. It is, in most cases, desirable to effect changes to an unloaded machine both because it lowers the chance of wear on the machine as well as saving fuel by delaying the unloaded versus loaded machine. In theory, a speed of the lead machine 114 may be increased to further distance it from the trailing machine 112, but in many cases the machine 114 may already be operating at a fastest desired speed. In other cases, an increase in speed may cause an undesired overlap with machine 116 or another machine ahead of machine 114. In an embodiment, all machines 112, 114, 116 are always monitored and predicted spread zone occupancy predictions are continuously updated for each machine.

Figure 3:
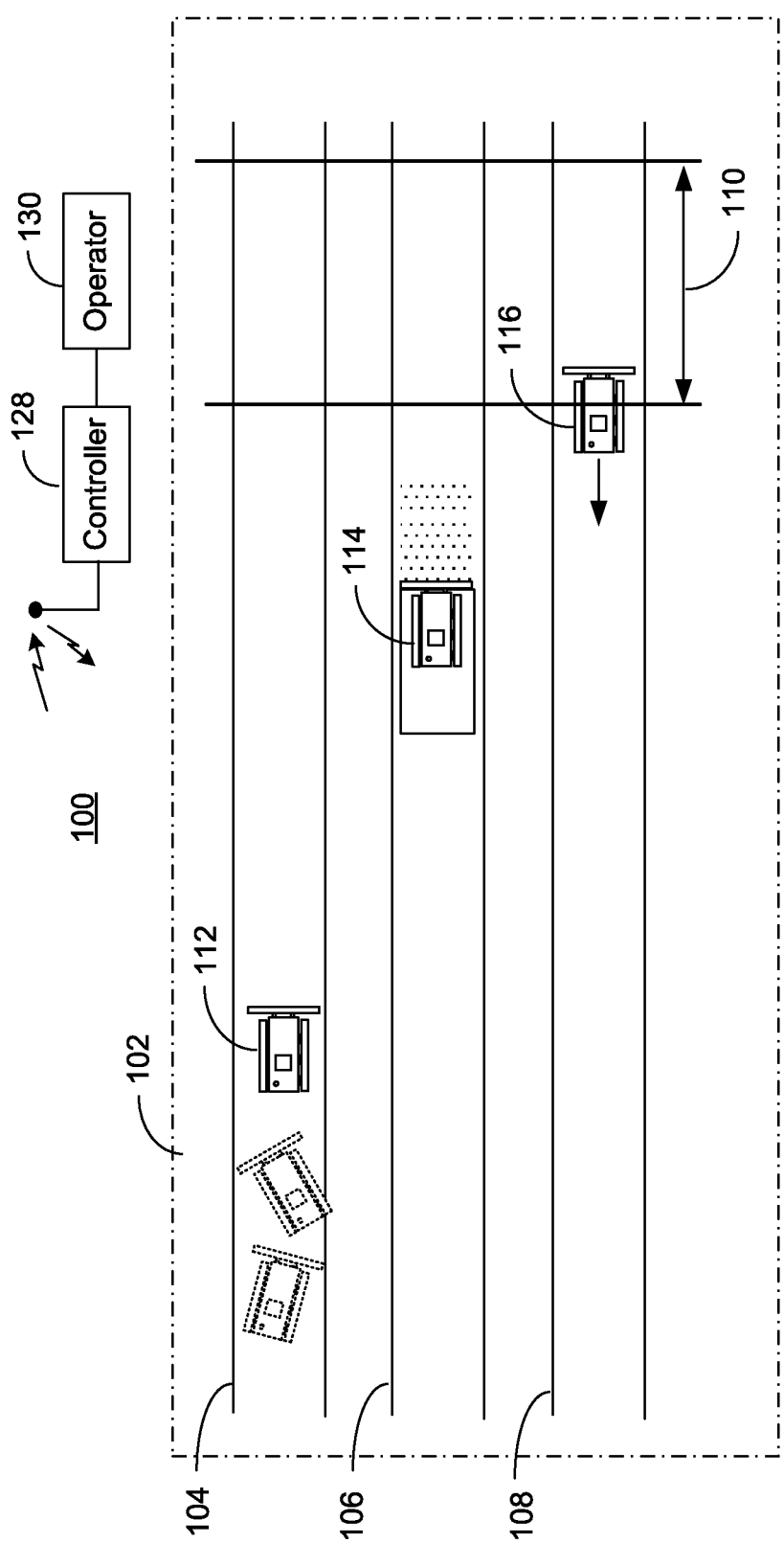
FIG. 3 is another plan view of the worksite of FIG. 1.

Referring to FIG. 3 and still referencing this current example, rather than stopping machine 112, the machine 112 may be driven in a zigzag or serpentine path to delay the entry of machine 112 into the spread zone 110 until after machine 114 can be unloaded and backed out of the spread zone 110. Variations of this exact protocol may be implemented, for example, two machines may be allowed in a spread zone 110 as long as one machine is in reverse and no longer under manual control.

The reduction in wear caused by selectively slowing or stopping machines 112, 114, 116 may be significant enough to warrant even a slight loss in productivity caused by taking such a step. Not only is wear reduced, reducing the cost associated with replacing worn parts, but the uptime is increased, allowing the machines to operate longer between maintenance downtimes.

Figure 4:
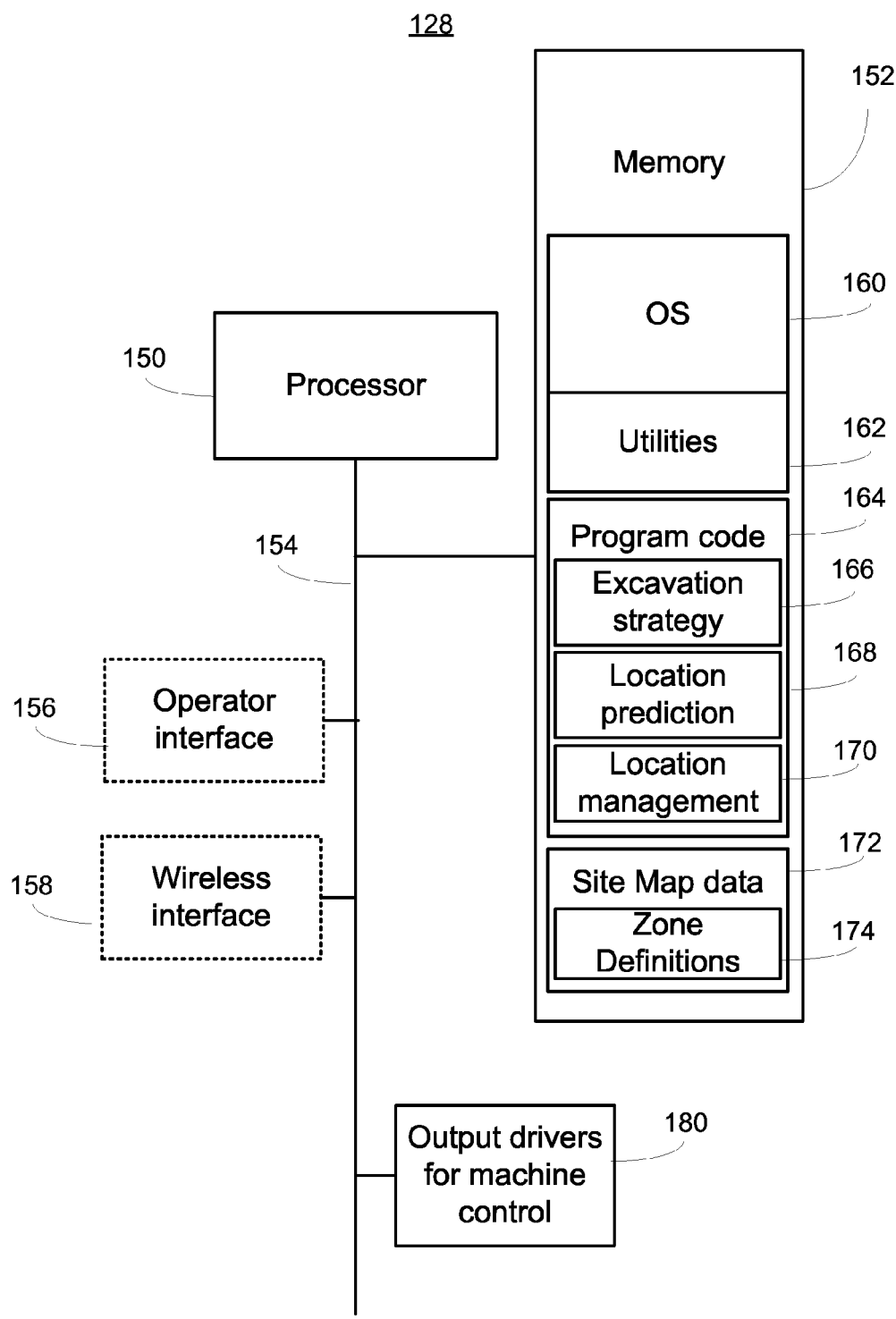
FIG. 4 is a block diagram of an exemplary controller for use in an automated mobile excavation machine control system.

FIG. 4 illustrates an exemplary controller 128 including a processor 150 and a memory 152 coupled by a data bus 154. The controller 128 may also include an operator interface 156 used to receive instructions, worksite definitions, and for manual control of a machine when required. Machine input data may be received via one or more wireless interfaces 158 and may include, as discussed above, machine position, machine operating information such as blade load drawbar pull, as well as machine status information such as temperatures, pressures, warning indicators, and fuel load.

The memory 152 may be any combination of volatile and nonvolatile memory including both solid-state and rotating media but does not include propagated media such as carrier waves. The memory 152 may include an operating system 160 and utilities 162 used to support basic functionality and set up of the controller 128. The memory 152 may also include program code 164. The program code 164 may include executable instructions that are used by the processor 150 to define and implement an excavation strategy 166 related to worksite operations as well as a location prediction module 168 and a location management module 170. The location prediction module may use a number of inputs to determine speed and run times for machines 112, 114, 116 including, but not limited to, loaded volume predictions, pitch (slope) prediction, terrain curvature, learned material hardness, and multipliers based on previous run data. The location management module 170 may operate on data developed by the location prediction module 168 to slow or stop a machine 112, 114, 116 responsive to a prediction that more than a limit number of machines will concurrently reside in a spread zone 110. Site map data 172 may include contour and other information about the worksite 102 and may include a particular set of zone definition data 174, such as geographic boundaries received via programming or via the operator interface 156, that defines, for example, a spread zone 110.

The controller 128 may also include one or more output drivers 180 that send signals be of the same or different wireless connections to machines 112, 114, 116 to implement both automatic and manual control of those machines.

INDUSTRIAL APPLICABILITY

Figure 5:
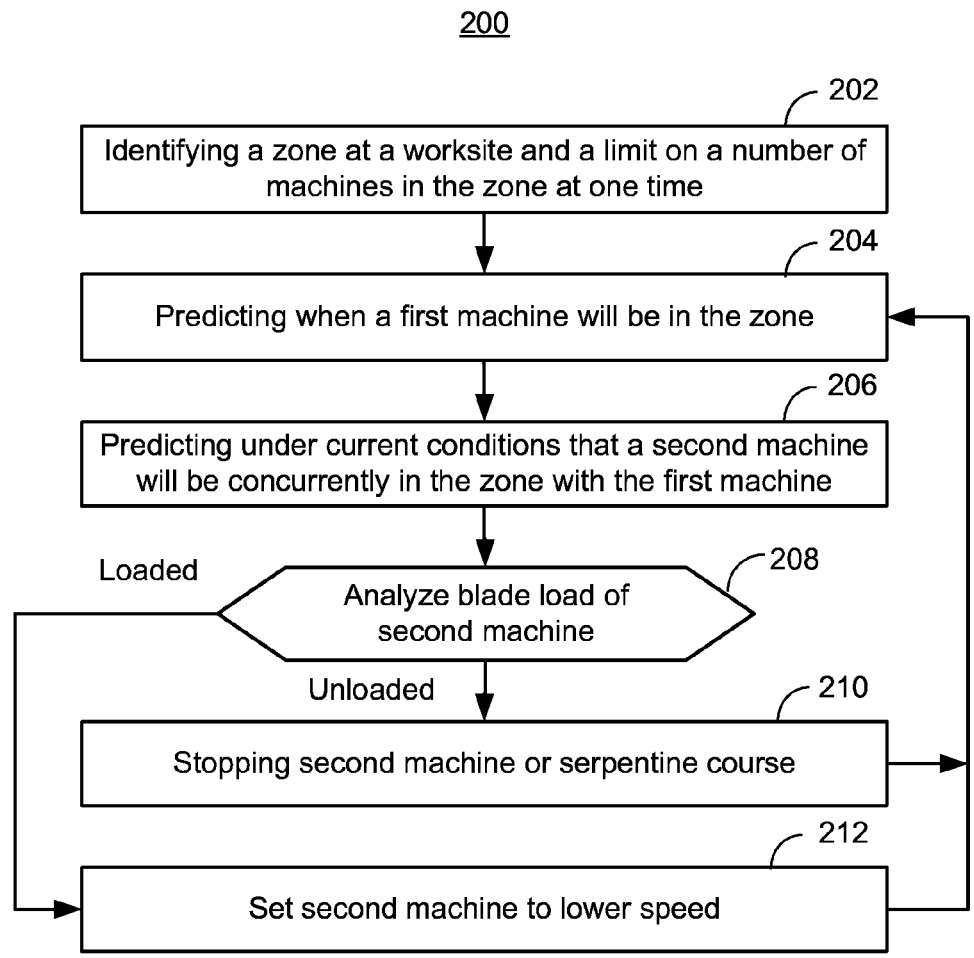
FIG. 5 is a flowchart of an exemplary method of managing automated excavation machines at a worksite.

FIG. 5 is a flowchart of an exemplary method 200 of regulating the pace of automated machines 112, 114, 116 at a worksite 102 to both increase safety and reduce component wear in the automated machines. Safety is increased when an operator is not faced with manually operating multiple machines in a spread zone 110. Component wear is reduced when machines are not stopped and started under heavily loaded conditions. At block 202, a spread zone 110 at a worksite 102 may be identified and a limit may be placed on the number of machines that are to be allowed in the zone 110 at any one time.

At block 204, a prediction may be made of a time when a first machine 116 will be in the zone 110. At block 206, a prediction may be made that under current operating conditions, such as a current speed, a second machine 114 will concurrently be in the zone 110 with the first machine 116. That is, if no changes to speed or course are made to either machine, both the first and second machine 114, 116 will be in the zone 110 at the same time.

At block 208, an analysis may be made of the blade load of the second machine 114. If the second machine 114 is loaded, the "loaded" branch may be taken from block 208 to block 212. At block 212, because the second machine 114 is carrying a load on its blade, the second machine 114 may be set to a lower speed either by throttling down or by reducing from a current gear to a lower gear so as to avoid coming to a complete stop. An amount of the speed reduction combined with the distance over which the delay is imposed may be used to determine a duration of the delay imposed on the second machine 114. In an exemplary embodiment, this delay may be in a range of four to six seconds.

Returning to block 208, if the second machine 114 is unloaded, the "unloaded" branch may be taken to block 210. At block 210, the second machine may be stopped, slowed, or delayed so that the desired delay required to avoid both machines being in the zone 110 is achieved. When stopped, the duration of the stop may simply be the desired time delay. When slowed, the change in speed multiplied by the travel distance at the lower speed can be calculated to give the time delay needed to avoid concurrent occupation in the zone 110. When increasing the path length, the speed times the increased distance can be calculated to give the desired time delay.

The ability to analyze a machine operating state and selectively stop or slow a machine based on its current load gives an operator 130 using automated excavating machines 112, 114, 116 a valuable tool to minimize wear and tear on expensive equipment while still maintaining manual control in areas where safety is an issue. Even if some delays are incurred in the above-described operations, overall uptime for equipment should be improved by reducing or eliminating the stop/start cycles of fully loaded machines so that the cost of slowing some machines slightly can be recouped through longer intervals between maintenance and fewer damaged components.

What is claimed is:

1. A method of managing automated machines at a worksite, the method comprising:
   identifying a zone at the worksite, the zone having geographic boundaries specified;
   setting a limit on a number of machines concurrently allowed in the zone;
   predicting when a first machine will be within the geographic boundaries of the zone;
   predicting that a second machine operating at current conditions will be within the geographic boundaries of the zone concurrently with the first machine, wherein the second machine's entry into the zone will cause the number of machines in the zone to exceed the limit;
   analyzing a load of a blade on the second machine; and
   when the blade of the second machine is loaded, setting, via a controller remote from the automated machines, the second machine to a lower speed than a current speed, the lower speed calculated to prevent the second machine from entering the zone while the first machine occupies the zone.

2. The method of claim 1, further comprising:
   when the blade of the second machine is unloaded, stopping, via the controller, the second machine for a duration calculated to prevent the second machine from entering the zone while the first machine occupies the zone.

3. The method of claim 1, wherein the zone is a spread gap associated with unloading the blade of the second machine.

4. The method of claim 1, wherein setting the second machine to the lower speed than the current speed comprises changing, via the controller, the second machine to a lower gear than a current gear.

5. The method of claim 1, wherein setting the second machine to the lower speed comprises reducing, via the controller, a throttle setting of the second machine.

6. The method of claim 5, wherein the controller stores the geographic boundaries of the zone and the limit on the number of machines in the zone.

7. The method of claim 6, wherein the controller predicts when the first machine will be within the geographic boundaries of the zone and that the second machine will be within the geographic boundaries of the zone concurrently with the first machine.

8. A system for managing automated machines at worksite comprising:
   a first machine that operates responsive to commands from a controller;
   a second machine that operates responsive to commands from the controller; and
   the controller configured to send operating commands to the first and second machines, wherein the controller:
      defines a zone with geographic boundaries at the worksite;
      predicts that more than a predetermined number of machines will be within the zone given a current operating state of each machine; and
      responsive to the prediction, controls the second machine according to a load of a blade on the second machine to prevent entry of the second machine into the zone when the first machine is in the zone.

9. The system of claim 8, wherein the controller determines the blade of the second machine is loaded and controls the second machine by reducing a speed of the second machine.

10. The system of claim 9, wherein reducing the speed of the second machine comprises operating the second machine in a lower gear than a current gear.

11. The system of claim 8, wherein the controller determines the blade of the second machine is unloaded and controls the second machine by stopping the second machine.

12. The system of claim 8, wherein the controller determines the blade of the second machine is unloaded and controls the second machine by directing the second machine in a serpentine path.

13. The system of claim 8, wherein the zone is a spread gap associated with unloading the blade.

14. The system of claim 8, wherein a maximum for the predetermined number of machines concurrently in the zone is two.

15. A controller that manages two or more automated machines operating in separate designated slots at a worksite, the controller comprising:
   a processor;

an output driver coupled to the processor used to control at least one automated machine; and a memory coupled to the processor storing executable instructions that cause the processor to:
identify a zone within the worksite;
identify a limit number of machines that can operate in the zone concurrently;
determine, based on a location prediction, when more than the limit number of machines will occupy the zone concurrently; and
based on the current operating state of at least one of the two or more machines, alter an operating characteristic of at least one of the two or more automated machines to prevent more than the limit number of machines from occupying the zone concurrently.

16. The controller of claim 15, further comprising an operator interface for receiving data that sets geographic boundaries of the zone at the worksite and the limit number of machines allowed concurrently in the zone.

17. The controller of claim 15, wherein the current operating state of the at least one of the two or more automated machines is a load on a blade and the controller has further executable instructions that analyze the load on the blade of the at least one of the two or more automated machines and alters the operating characteristic by causing the at least one of the two or more automated machines to slow down when the blade of the at least one of the two or more automated machines is loaded.

18. The controller of claim 15, wherein the current operating state of the at least one of the two or more automated machines is a load on a blade and the controller has further executable instructions that analyze the load on the blade of the at least one of the two or more automated machines and alters the operating characteristic by causing the at least one of the two or more automated machines to stop when the blade of the at least one of the two or more automated machines is unloaded.

19. The controller of claim 15, wherein the current operating state of the at least one of the two or more automated machines is a load on a blade and the controller has further executable instructions that analyze the load on the blade of the at least one of the two or more automated machines and alters the operating characteristic by causing the at least one of the two or more automated machines to travel in a serpentine path when the blade of the at least one of the two or more automated machines is unloaded.

20. The controller of claim 15, wherein the controller further comprises a wireless interface that receives data corresponding to the current operating state from each of the two or more automated machines.

* * * * *